United States Patent
Bratkovski et al.

(10) Patent No.: US 7,043,104 B1
(45) Date of Patent: May 9, 2006

(54) HIGH GAIN OPTICAL PROBE

(75) Inventors: Alexandre Bratkovski, Mountain View, CA (US); Shih-Yuan Wang, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/152,857

(22) Filed: Jun. 14, 2005

(51) Int. Cl.
*G02B 6/00* (2006.01)
*G02B 6/26* (2006.01)

(52) U.S. Cl. .......................... 385/12; 385/43; 385/902

(58) Field of Classification Search ..................... None
See application file for complete search history.

(56) References Cited

U.S. PATENT DOCUMENTS

| | | | |
|---|---|---|---|
| 4,604,520 A | 8/1986 | Pohl | |
| 5,272,330 A | 12/1993 | Betzig et al. | |
| 5,389,779 A | 2/1995 | Betzig et al. | |
| 5,410,151 A | 4/1995 | Buckland | |
| 5,664,036 A | 9/1997 | Islam | |
| 5,748,318 A * | 5/1998 | Maris et al. | 356/630 |
| 5,789,742 A | 8/1998 | Wolff | |
| 5,894,122 A | 4/1999 | Tomita | |
| 5,994,691 A | 11/1999 | Konada | |
| 6,194,711 B1 | 2/2001 | Tomita | |
| 6,324,326 B1 * | 11/2001 | Dejneka et al. | 385/123 |
| 2003/0085351 A1 * | 5/2003 | Nakajima et al. | 250/306 |

* cited by examiner

*Primary Examiner*—Rodney Bovernick
*Assistant Examiner*—Omar Rojas

(57) ABSTRACT

A near-field scanning optical probe comprises an optical fiber for conducting imaging light therethrough, the fiber having at least a portion doped with an optical gain medium and further having a tapered end portion with a frustoconical wall and an end surface for emitting the imaging light. In use, pumping light and optionally imaging light are coupled into the optical fiber such that the pumping light excites the optical gain medium to a higher energy state to emit photons at the approximate wavelength of the imaging light desired, to thereby produce and optionally amplify the imaging light emitted by the probe.

18 Claims, 2 Drawing Sheets

HIGH GAIN OPTICAL PROBE

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO AN APPENDIX

Not applicable.

BACKGROUND

1. Technical Field

The invention relates generally to optical scanning, such as near-field scanning optical microscopy.

2. Description of Related Art

Scanning Probe Microscopy has enabled imaging of surfaces at the nanometer scale by employing a fine probe that is scanned over a surface (or the surface is scanned under the probe), rendering resolutions that are no longer constrained by the wavelength of light or electrons and that can resolve individual atoms. Different actual techniques have been developed under the general guise of Scanning Probe Microscopy, including STM (scanning tunneling microscopy), AFM (atomic force microscopy), and NSOM (Near-Field Scanning Optical Microscopy).

NSOM typically uses laser light emitted through an aperture much smaller than the wavelength of the light (on the order of less than 100 nm), thus achieving resolutions better than the diffraction limit. The probe, however, must be scanned much closer to the surface than the wavelength of the light. Typically, the laser light is fed to the aperture through an optical fiber and the aperture itself is the sharpened or tapered end of the fiber, which can also be coated with a metal such as Al. Different types of feedback mechanisms can be employed to maintain the required probe-to-surface distance, but the most common are by using a cantilevered probe to monitor the normal force through beam-deflection, and by using a tuning fork attached to the fiber and oscillating at its resonant frequency to monitor changes in the vibration amplitude as the probe moves over the surface (also known as "shear-force" feedback).

Examples of optical near-field scanning microscopes are known, and include near field scanning microscopes having a tapered waveguide, fiber optic probes, high resolution fiber optic probes for near field scanning, near-field scanning optical microscope probes exhibiting resonant plasmon excitation, as well as methods and devices for near-field scanning optical microscopy by reflective optical feedback.

An NSOM may be operated in a number of modes, typically selected in view of the sample to be imaged. In transmission mode, the light travels through the probe aperture and is transmitted through the sample (and therefore requires a transparent sample). In reflection mode, the light travels through the probe aperture and is reflected by the surface. In collection mode, the sample is illuminated by a large outside light source and the probe collects the reflected light. And in illumination/collection mode, the probe both illuminates the sample and collects the reflected light.

As can be appreciated, most modes of operation can stand to benefit from a probe that can emitter a brighter (stronger) light. The present writing addresses this need.

BRIEF SUMMARY

The disclosure generally provides for a near-field scanning optical probe assembly comprising an optical fiber for conducting imaging light therethrough, the fiber having at least a portion doped with an optical gain medium and further having a tapered end portion with a frustoconical wall and an end surface for emitting the imaging light, and a pumping light source optically coupled to the optical fiber to supply pumping light into the optical fiber at a wavelength sufficient to excite the optical gain medium to a higher energy state.

In another embodiment, a near-field scanning optical probe comprises an optical fiber for conducting imaging light therethrough and having a diameter, the fiber comprising a portion doped with an optical gain medium and a tapered end portion with a frustoconical wall and an end surface for emitting the imaging light, the end surface having a diameter smaller than the diameter of the optical fiber.

In yet another embodiment, a method of emitting scanning light for near-field scanning optical microscopy comprises selecting an optical probe comprising an optical fiber for conducting imaging light therethrough and having a diameter, the fiber comprising a portion doped with an optical gain medium and a tapered end portion with a frustoconical wall and an end surface for emitting the imaging light, the end surface having a diameter smaller than the diameter of the optical fiber; and supplying pumping light into the fiber at a wavelength sufficient to excite the optical gain medium to a higher energy state.

The foregoing summary is not intended to be inclusive of all aspects, objects, advantages and features of the present invention nor should any limitation on the scope of the invention be implied therefrom. This Brief Summary is provided in accordance with the mandate of 37 C.F.R. 1.73 and M.P.E.P. 608.01 (d) merely to apprise the public, and more especially those interested in the particular art to which the invention relates, of the nature of the invention in order to be of assistance in aiding ready understanding of the patent in future searches.

Like reference designations represent like features throughout the drawings. The drawings in this specification should be understood as not being drawn to scale unless specifically annotated as such.

DETAILED DESCRIPTION

Figure 1:
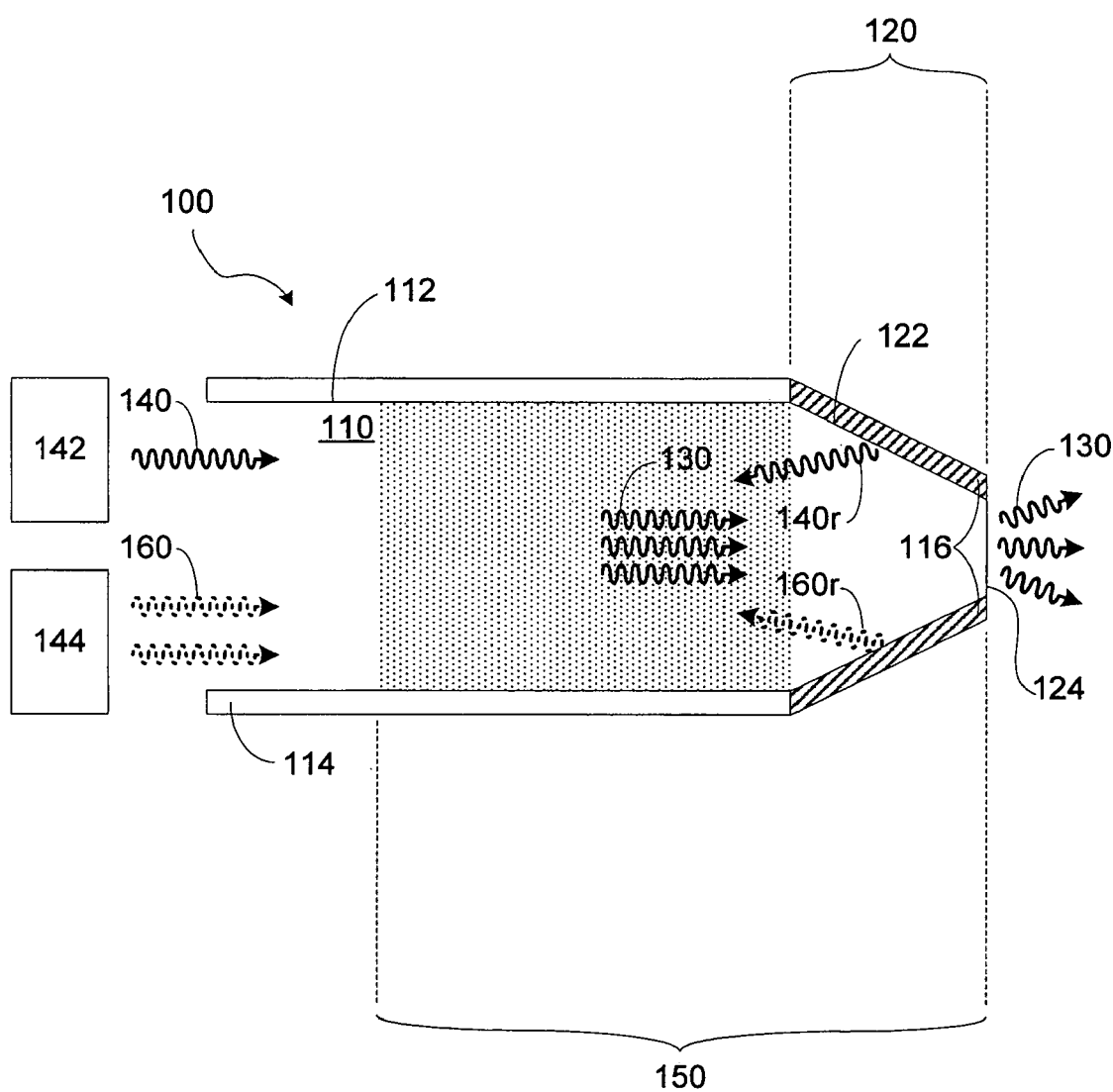
FIG. 1 is a schematic depiction of an optical probe in accordance with the present disclosure.

The present writing addresses the need for an NSOM optical probe that can emit a brighter scanning light by providing a probe with enhanced optical gain. With reference to FIG. 1, an embodiment of an optical probe 100 according to the present writing includes a length of optical fiber 110 having a tapered end portion 120 with a frustoconical wall 122 extending from the wall 112 of the optical fiber 110 to an end surface 124 from which amplified scanning light 130 is emitted. The optical fiber may typically include a cladding 114 disposed around its circumference or wall 112. As known in the art, the end surface 124 is typically formed with a diameter smaller, typically significantly smaller, than the wavelength $\lambda_i$ of scanning light 140 that is coupled into the optical fiber by an imaging light source 142.

The optical fiber 110 of the optical probe 100 described herein further includes a portion 150 that is doped with an optical gain medium such as a rare earth, and more particularly such as ions of praseodymium (Pr), thulium (Tm), erbium (Er) or ytterbium (Yb), the use of which is well known and documented in the art. Although it is understood that it may be preferable to dope a portion of the optical fiber that is near the emitter end surface 124, the present invention is in no way limited in the placement of the doped portion, nor the length of this portion, nor the type or amounts of doping ions, all of which may be adjusted as required by specific uses. Thus, it is to be understood that the embodiment of FIG. 1 is shown as having a doped portion 150 that encompasses the tapered end portion 120 for illustration purposes only.

Still referring to FIG. 1, the optical probe 100 may further include a metal coating 116 disposed over the frustoconical wall 122 of the tapered end portion 120, as may be dictated by the intended use and strength of the emitted light 130.

In a preferred manner of use of the optical probe 100 described herein, an imaging light source 142 may be disposed so as to couple imaging light 140 having a desired wavelength $\lambda_i$ into the optical probe to be transmitted therethrough towards the end surface 124 to be emitted therethrough. Furthermore, a pumping light source 144 is similarly disposed to couple pumping light 160 having a desired wavelength $\lambda_p$ into the optical probe. The wavelength $\lambda_p$ of the pumping light may be selected so as to excite the optical gain medium in the doped portion 150 of the optical probe to a higher energy state, such as through the well documented process of upconversion, from which the optical gain medium can emit photons at the approximate wavelength $\lambda_i$ of the imaging light, thereby amplifying the imaging light 140 to produce amplified imaging light 130. As will be appreciated, the pumping efficiency is enhanced by the presence of the frustoconical wall 122, the inner surface of which acts as a reflector that reflects both pumping light 160r and imaging light 140r internally within the optical probe.

Figure 2:
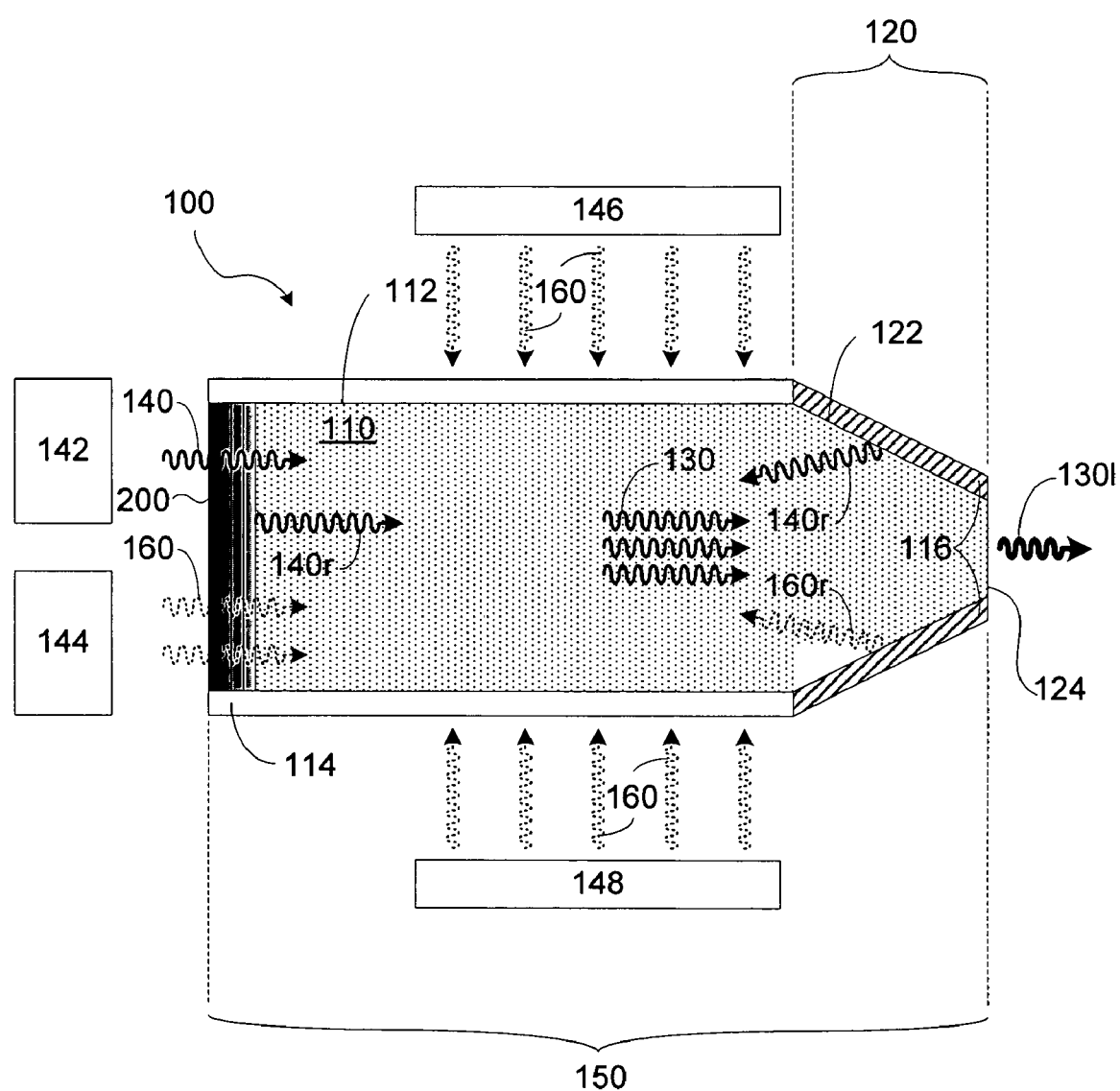
FIG. 2 is a schematic depiction of another optical probe in accordance with the present disclosure.

The pumping light 160 may be supplied at sufficient power and/or reflected with sufficient efficiency to either amplify the imaging light 140 or to lase the imaging light, thereby creating a laser of imaging light 130l (FIG. 2). Although a laser has much narrower bandwidth and thus is of limited use in a collection mode of operation, it may be desired in other applications such as single cell spectroscopy.

To further enhance the pumping efficiency of the optical probe of the present invention, such as may be desired in a lasing application, another embodiment of an optical probe 101 described herein, and shown in FIG. 2, may be provided similar to optical probe 100, but further include a dielectric reflector 200 mounted to the optical fiber 110 in a manner so as to further internally reflect imaging light 140r. The embodiment of FIG. 2 is further shown, for illustration purposes only, as including a doped portion 150 that extends over the entire length of the optical fiber 110. The dielectric reflector 200, also known as a Bragg mirror, is a sub-class of photonic crystals that comprise multiple dielectric layers of different refractive index (and typically of quarter wavelength thickness) chosen so that light of a certain wavelength is reflected at each layer interface and all other light is transmitted. In dielectric mirrors, the layers are formed so that the phase of the reflected light waves add up constructively in a certain direction, and thus light with wavelength matching the periodicity index of the dielectric mirror is almost completely reflected, while all other light is transmitted therethrough. Non-limiting examples of materials for forming the dielectric layers include magnesium fluoride, hafnium oxide, silicon nitride, silicon dioxide, and calcium fluoride. The dielectric reflector 200 of the optical probe 101 described herein may be formed to allow pumping light 160 to pass therethrough and to reflect the imaging light 140. This is possible because in most practical applications, the pumping light will have a wavelength $\lambda_p$ different from the wavelength $\lambda_i$ of the imaging light, especially when employing upconversion.

Those skilled in the art will have recognized that one embodiment of the present invention may be practiced by forming an NSOM-type tapered end on an upconversion fiber laser of the type known in the state of the art. Thus, in another embodiment of the practice of the present invention, a probe 100 may be operated in lasing mode by supplying solely pumping light 160 from a pumping light source 144, with no imaging light 140 being coupled into the optical fiber 110. As detailed above, a probe operated in this mode will benefit from the provision of a dielectric reflector 200.

It is to be understood that the present invention is in no way limited by the number, placement, material of construction, and configuration of the reflectors, or of the pumping light sources. Thus, for illustration purposes only, the embodiment of FIG. 2 further utilizes additional pumping light sources 146 and 148 disposed so as to impinge pumping light 160 onto the wall 112 of the optical fiber 110 to be absorbed thereby and reflected therein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for. . ." and no method or process step herein is to be construed under those provisions unless the step, or steps, are expressly recited using the phrase "comprising the step(s) of. . . ."

What is claimed is:

1. An optical probe assembly, comprising:
   an optical fiber for conducting light therethrough, the fiber having at least a portion doped with an optical gain medium and further having a tapered end portion with a frustoconical wall and an end surface for emitting imaging light;
   a pumping light source optically coupled to the optical fiber to supply pumping light into the optical fiber at a wavelength sufficient to excite the optical gain medium to a higher energy state; and
   an imaging light source optically coupled to the optical fiber to supply imaging light into the fiber.

2. The optical probe assembly of claim 1, further comprising:
   a dielectric reflector mounted with the optical fiber to reflect imaging light transmitted therethrough.

3. The optical probe assembly of claim 1, wherein the frustoconical wall of the tapered end portion is coated with a metal.

4. The optical probe assembly of claim 1, wherein the optical gain medium is a rare earth.

5. The optical probe assembly of claim 4, wherein the optical gain medium is selected from the group consisting of Erbium, Ytterbium, Thulium and Praseodymium.

6. The optical probe of claim 1, wherein the doped portion extends over the entire length of the optical fiber.

7. An optical probe, comprising:
   an optical fiber for conducting imaging light therethrough and having a diameter, the fiber comprising:
   a portion doped with an optical gain medium; and
   a tapered end portion with a frustoconical wall and an end surface for emitting the imaging light, the end surface having a diameter smaller than the diameter of the optical fiber; the probe further comprising
   a pumping light source optically coupled to the optical fiber to supply pumping light into the optical fiber at a wavelength sufficient to excite the optical gain medium to a higher energy state; and
   an imaging light source optically coupled to the optical fiber to supply the imaging light into the fiber.

8. The optical probe of claim 7, wherein the doped portion extends over the entire length of the optical fiber.

9. The optical probe of claim 7, wherein the doped portion extends over the tapered end portion.

10. The optical probe assembly of claim 7, further comprising:
    a dielectric reflector mounted with the optical fiber to reflect pumping light transmitted therethrough.

11. The optical probe assembly of claim 7, wherein the frustoconical wall of the tapered end portion is coated with a metal.

12. The optical probe assembly of claim 7, wherein the optical gain medium is a rare earth.

13. The optical probe assembly of claim 12, wherein the optical gain medium is selected from the group consisting of Erbium, Ytterbium, Thulium and Praseodymium.

14. A method of emitting scanning light for near-field scanning optical microscopy, comprising:
    selecting an optical probe comprising an optical fiber for conducting imaging light therethrough and having a diameter, the fiber comprising a portion doped with an optical gain medium and a tapered end portion with a frustoconical wall and an end surface for emitting imaging light, the end surface having a diameter smaller than the diameter of the optical fiber; and
    supplying pumping light into the fiber at a wavelength sufficient to excite the optical gain medium to a higher energy state; and
    supplying imaging light into the fiber.

15. The method of claim 14, wherein the doped portion of the optical probe extends over the entire length of the optical fiber.

16. The method of claim 14, wherein the optical probe further comprises:
    a dielectric reflector mounted with the optical fiber to reflect pumping light transmitted therethrough.

17. The method of claim 14, wherein the frustoconical wall of the tapered end portion of the optical probe is coated with a metal.

18. The method of claim 14, wherein the optical gain medium is a rare earth.

* * * * *